United States Patent Office 3,179,530
Patented Apr. 20, 1965

3,179,530
CATALYST SYSTEMS FOR ALKYD RESINS
J Alden Erikson and Bruce N. McBane, Gibsonia, Pa.,
assignors to Pittsburgh Plate Glass Company, Pittsburgh, Pa., a corporation of Pennsylvania
No Drawing. Filed Apr. 26, 1961, Ser. No. 105,561
11 Claims. (Cl. 106—263)

This invention relates to the curing of air drying films and it has particular relation to improvements in the catalyzation of the cure of films containing an ester of a polyhydric alcohol and drying oil acid or a polyester of a mixture of a dicarboxylic acid and a drying oil acid with a polyhydric alcohol.

It has heretofore been recognized that films containing as vehicular components esters and polyesters, such as glyceride drying oils and drying oil modified alkyd resins, often have a capacity for air drying through atmospheric oxidation reactions at the double bonds in the groups constituting fatty acid radicals. The reaction inherently is relatively slow and if unassisted, for example, by baking, may require many hours or even days. In order to speed up the drying effects, it is customary to add to the film-forming constituents a catalyst of oxidation. Such catalysts usually comprise the soaps of siccative metals, such as nickel, cobalt, lead, manganese, and others, or various combinations thereof, which are soluble in oil or resin. The acid components of these driers comprise naphthenic acid, oleic acid, linoleic acid, rosin acids, benzoic acid, stearic acid, and others which are monocarboxylic and will provide soaps with the drier metals that are soluble in the vehicles. Even when these driers are used, the films still have long induction periods before they start to dry.

It has further been observed that the drying of the films containing the foregoing driers, at least in the initial induction stages, is greatly expedited by the addition of certain peroxidic catalysts, many of which are available and may be used for the purpose. A partial list of such peroxidic catalysts which may be used in the air drying of various films containing esters of drying oil acids is as follows:

Ditertiary butyl peroxide
Tertiary butyl perbenzoate
Ditertiary butyl diperphthalate
2,2-bis-tertiary butyl peroxy(butane)
Tertiary butyl hydroperoxide
Cumene hydroperoxide
Benzoyl peroxide
Methyl isobutyl ketone peroxide
Methyl ethyl ketone peroxide
Dichlorobenzoyl peroxide
Lauroyl peroxide
Methyl benzyl hydroperoxide Although these catalysts are quite active in their oxidational effects when used with the driers aforementioned, and their use materially shortens the induction period, the combinations of drier and catalyst are often still not entirely satisfactory in the curing of many of the films containing esters of drying oil acids. One of the more important problems presented in their use resides in a strong tendency of films of the more active of the esters or polyesters superficially to air dry at the surface where they contact with oxygen, thus to provide an outer skin of solid resin which is apparently relatively impermeable to oxygen. The deeper layers, because of the exclusion of oxygen, may remain soft and uncured for long periods of time. Needless to say, a film, the base of which is still soft and uncured, is very sensitive to accidental damage. Furthermore, there is a tendency for many of the films when the surface is thus skinned over before the drying of the deeper layers has progressed to a substantial degree, to wrinkle as they slowly dry through, thus producing frosting effects which impair the gloss of the coatings.

This invention is based upon the provision of a catalyst system for use in the curing of films containing esters and polyesters wherein highly unsaturated drying oil acids are components and which films will dry through within a relatively short time and without appreciable wrinkling effects. The fundamental observation upon which the invention is based is that the foregoing desirable results can readily be obtained by using in the film-forming material conjointly with a soap of a drier metal and a peroxidic catalyst, a small amount of a phenol, a sterically hindered phenolic inhibitor of oxidation being especially useful.

A great many phenolic inhibitors of polymerization have been recognized in the prior art. Many of these, however, are not entirely satisfactory for use with peroxidic catalysts in accordance with the provisions of this invention. For example, they may be of poor solubility in the resin or its constituents. Their color may be objectionable, or they may oxidize to form objectionable colored compounds in the film. They may also be unstable and may be destroyed or degraded in the package before the material can be used. Furthermore, they may be volatile and they, or their vapors, may be overly toxic or irritating to personnel working with them or in their proximity. They may further lack in selectivity in their inhibitory action and may even unduly slow down the desired curing reactions. It has also been observed that some of them at certain concentrations may actually operate as catalysts of curing. Some of them may also tend violently to react with peroxides or hydroperoxides.

It has now been found that a sterically hindered phenol, such as one wherein a benzene ring having a single hydroxyl group replacing hydrogen and having the hydrogen groups of both ortho positions replaced by nonfunctioning groups, such as methyl, ethyl, propyl, tertiary butyl, chlorine, bromine, iodine or the like groups, is a very effective inhibitor of the formation of thin impermeable layers on the surface of air drying alkyd resins. The foregoing groups apparently are adapted to set up steric hindrance that prevents the ready contact of the phenol group with active peroxides of large molecular structure, such as the peroxides inherently formed from drying oil acids or the radicals thereof in various esters used in the formation of air drying films. At the same time, they can accept some of the relatively small oxygen molecules at the surface before they can cause surface skinning. Ready permeation of oxygen to the deeper layers can therefore take place.

Particularly effective inhibitors are of the formula:

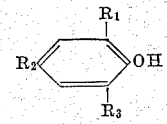

wherein groups $R_1$, $R_2$ and $R_3$ are like or unlike and are selected from the class consisting of methyl, ethyl, propyl, tertiary butyl, butyl, amyl, hexyl, chlorine, bromine or iodine. The hydroxyl seems to be quite well protected from oxidational effects of peroxides, but it is readily available to elemental oxygen.

One highly effective group of this class comprises compounds which are 2,4,6-trialkyl phenols, of which the presently preferred member is 2,6-ditertiary butyl-4-methyl phenol, which is sold commercially in highly pure state under the trade name of Ionol. This material is a solid, is relatively nonvolatile and therefore will remain in the resin composition to which it is added with little or no change even over considerable periods of time. It is non-toxic, at least in any reasonable concentration, and surprisingly, it does not react with the peroxide or hydroperoxide with which it is admixed to give an unstable or explosive composition. It, therefore, is adapted to be mixed with the peroxide catalysts to form mixtures which can be shipped and stored as packages, but which can be added by the user to any of the air drying paint or varnish compositions at the time the latter are to be applied, or within a reasonable period prior thereto.

A very small amount of the sterically hindered phenol may be added with the peroxidic catalyst as a preformed mixture. The amount may be as low as 0.005 percent by weight based upon the binder resin, but may also be much greater. Ranges up to about 1 percent by weight based upon the binder resin may be used.

The sterically hindered phenols herein disclosed may be used in combination with various peroxides, including those of the general type ROOR. A great many of these are disclosed in the monograph entitled "Organic Peroxides" by Arthur B. Tobolasky and Robert B. Mesrobian, copyrighted in 1954 by Interscience Publishers, Inc.

Those listed on pages 158–163, which are organic hydroperoxides and have the general structure ROOH, wherein R is organic, are especially important in the practice of this invention. Examples of these hydroperoxides comprise tertiary butyl hydroperoxide, methyl benzyl hydroperoxide, cumene hydroperoxide and others of the same general family. These hydroperoxides in many instances are comparatively stable and do not liberate free radicals, except at rather high temperatures, and usually are not very effective as catalysts of oxidation in esters of drying oil acids, except when the films thereof are subjected to baking. Surprisingly, it has been found that very often when the combination of a sterically hindered phenol and a hydroperoxide is used in a coating composition which is an ester containing a drier metal, faster and better cures even at room temperatures are obtained than are obtained with the less stable peroxides which usually are employed for low temperature curing of the films. The organic peroxides or hydroperoxides may be used in amounts of about 0.1 to about 8 percent by weight based upon the alkyd resin content of the mixture.

The mixtures of sterically hindered phenols and organic peroxidic catalysts disclosed herein may be used to promote the curing of various air drying esters containing a plurality of drying oil acid radicals per molecule.

For example, they may be used in mixtures containing a metallic drier and a conjugated glyceride drying oil, such as tung oil, dehydrated castor oil, oiticica oil and others of the same type, which because of conjugation of double bonds in the glyceride molecule, tend to dry relatively rapidly and which sometimes tend to produce frosting effects because of the formation of a superficial film on the surface that prevents the penetration of oxygen into the deeper strata of the coating film.

Other and often preferred types of esters comprise the so-called alkyd resins, wherein a polyhydric alcohol is in effect reacted with a mixture of acids. One of these acids is dicarboxylic, most usually being represented by phthalic anhydride, isophthalic acid, maleic anhydride, itaconic acid and others. Mixtures of two or more of the acids (or their anhydrides) may also be used. A second acid component is monocarboxylic and is represented by the drying oil acids, such as linoleic acid, linolenic acid, elaeostearic acid, and others containing two or more double bonds in carbon to carbon conjugation or in non-conjugate relationship with other other.

Pure monocarboxylic acids may be mixed with a dicarboxylic acid and with glycerol or other polyol containing three or more hydroxyl groups, and then reacted to provide an alkyd type polyester. In many instances, the mixture of acids obtained by the hydrolysis of drying or semi-drying oils, such as linseed oil, soya oil, safflower oil, tung oil, or others that include non-drying acids, such as oleic acid, stearic acid, palmitic acid, lauric acid and others, along with the more highly unsaturated acids, may be used. These mixtures of acids, along with phthalic acid, may be reacted with a polyol component to provide an air drying alkyd resin in accordance with the provisions of the present invention. In addition to these acids naturally occurring in combination with the unsaturated acids having air drying properties, there may also be added to the esterifiable mixture, various monocarboxylic acids, such as benzoic acid, rosin acids, tall oil acids, and the like.

Reaction of free fatty acids, dicarboxylic acids (or anhydrides) and polyhydric alcohols constitutes but one method of preparing alkyd resins having air drying properties and which may be used with the combinations of peroxidic catalysts and sterically hindered phenols in accordance with the provisions of the present invention.

In many instances, it is preferred to mix a glyceride drying oil or semi-drying oil, represented by linseed oil, safflower oil, soya bean oil, tung oil or others, with added polyol, such as glycerol, pentaerythritol, trimethylolethane, trimethylolpropane and others, and heat the mixture to form a monoglyceride or diglyceride which will further react with a dicarboxylic acid or its anhydride.

The oil content of the resin may vary over a relatively broad range, for example, from about 30 to about 65 percent by weight based upon the mixture of esterifiable components. This will be well understood by those versed in the preparation of alkyd resins. The polyol is usually proportioned in approximate equivalency with respect to the sum of the acid components. The mixture is cooked to provide a polyester of low or fairly low acid value, for example, of an acid value below about 50. The acid value may be much lower than this and may even approach 0, though usually as a matter of practicality in cooking operations, it is somewhat higher than the latter value and is in a range of about 2 or 3 to 15 or 20.

The alkyd resins should be soluble in aromatic solvents and hydrogenated naphthas. If they are of very long oil length, they may even be used without added solvents for some purposes.

The cooking of drying oils or their free acids with a polyhydric alcohol and a dicarboxylic acid to form alkyds is well understood by those skilled in the art and need not be further discussed herein.

The systems of catalysts and sterically hindered phenols may be used in any of the oil or alkyd coating compositions which have air drying properties. These alkyds will usually contain a drier, such as one or a combination of two or more of the drier metal soaps, in an amount to provide a total of about 0.01 percent to about 4 percent of metal based upon the alkyd resin. The proportions of drier and peroxide are about the same as would conventionally be used in the absence of inhibitor. They will promote rapid and complete drying of the films even at room temperatures. The compositions may be clear or colored with nonreactive colorants, such as titanium oxide and other pigments.

They are particularly useful in retouch or refinish enamels which often cannot be baked without objectionably affecting the original coatings. They may be used to coat iron, steel, stone, brick and wood, either with or without primers.

The coatings may also contain added modifiers, such as plasticizers, modifying resins such as aminoplasts, nitrocellulose, phenol-formaldehyde resins and others.

The following examples are illustrative of the principles of the invention:

Example I

In this example, a liquid alkyd resin was prepared comprising:

| | Parts by weight based on the product |
|---|---|
| Linseed oil | 54.4 |
| Glycerol phthalate | 43.4 |
| Excess glycerol | 2.2 |

The linseed oil and part of the glycerine were transesterified using litharge catalyst, and the product obtained was esterified with phthalic acid and added glycerine in conventional manner to evolve water and to form an alkyd resin of an acid value of 4 and a Gardner-Holdt viscosity taken in a 55 percent by weight solution in high flash naphtha at 77° F. or from W to X. To the alkyd resin was added a mixture of driers in the form of carboxylic acid salts of the metals comprising:

| | Percent [1] |
|---|---|
| Lead | 1.0 |
| Cobalt | 0.15 |
| Manganese | 0.02 |

[1] Percentages of metal are based upon the alkyd resin.

If desired, the resin may further contain an anti-skinning agent, though this is not necessary except when the compositions are to be stored for substantial periods of time. Appropriate anti-skinning agents comprise cresylic acids and oximes of such aliphatic ketones as methyl butyl ketone or methyl ethyl ketone.

A resin solution was prepared comprising:

| | Parts by weight |
|---|---|
| Alkyd resin and driers | 290 |
| Hydrogenated naphtha (solvent) | 444 |
| Coloring matter (nonreactive, essentially $TiO_2$) | 155 |

A mixture was made up which was added to the above enamel at a ratio of approximately 25 percent of the volume of the enamel. This catalyst solution comprised:

| | Percent by weight |
|---|---|
| Cumene hydroperoxide | 15.00 |
| 2,6-ditertiary butyl-4-methyl phenol | 0.05 |
| Hydrogenated naphtha | 84.95 |

This mixture was added to the alkyd resin solution just prior to the use thereof in forming films.

The catalyzed mixture was spread upon a surface of glass substrate and cured at room temperature. The dried films were relatively free from wrinkling and frosting effects. As compared to films comprised of drying alkyds modified only with a drier, a tack-free state was obtained in about half the time. As compared with uninhibited peroxidic additions to the enamel, the catalyst described continued to provide a substantial reduction in drying time, but had the advantage of avoiding wrinkling that might otherwise occur. The inhibited catalyst described further provided a harder through-dry.

It is especially advantageous under adverse conditions, as for instance, on hot and moist, or moist but cool days when air drying alkyds are especially difficult to dry satisfactorily. On a hot humid day, conventional enamels will wrinkle badly on drying. On a cool, humid day, drying is very slow. The use in an enamel of a catalyst system compising drier metal, hydroperoxide and a phenolic inhibitor, wherein the ortho hydrogens are replaced by larger groups to set up stearic hindrance as herein described, results in much better drying under like conditions.

In the preparation of the alkyd resin used in the foregoing coating composition, phthalic anhydride may be replaced with isophthalic acid, maleic anhydride, itaconic acid, and others. Linseed oil may be replaced by other oils or acids thereof, such as soya oil or acids, safflower oil or acids, hydrogenated castor oil or acids. The percentage of oil in the resin may vary within a range of about 30 percent by weight and about 65 percent by weight. Glycerol may be replaced by an equivalent amount of another polyhydric alcohol, such as pentaerythritol, trimethylolethane, trimethylolpropane and others.

Cumene hydroperoxide may be replaced by other peroxides or hydroperoxides, such as one of those listed in the monograph previously referred to.

Hydrogenated naphtha may be replaced by other nonreactive solvents of alkyd resins, such as toluene, xylene, mineral spirits, lactol spirits, naphthas and others. Mixtures of two or more of these may also be used.

The 2,6-ditertiary butyl-4-methyl phenol may be replaced by other sterically hindered phenols as herein disclosed.

Example II

In this example, an air drying alkyd resin was employed as a clear solution. Samples of the liquid resin were prepared, wherein the first sample (A) contained a drier only, the second sample (B) contained a drier plus cumene hydroperoxide as a catalyst, and the third sample (C) contained a drier, cumene hydroperoxide, and as an inhibitor, 2,6-ditertiary butyl-4-methyl phenol.

The alkyd resin employed comprised:

| | Percent by weight |
|---|---|
| Linseed oil | 46.6 |
| Glycerol phthalate | 51.2 |
| Excess glycerine | 2.2 |

In forming the alkyd resin, the linseed oil was reacted with glycerol in order to provide partial glycerides; namely, monoglycerides and diglycerides. This is a well-known technique in the preparation of alkyd resins. Subsequentially, the phthalic anhydride, together with additional glycerine, was added and the mixture was cooked to an acid number of 8 and a viscosity on the Gardner-Holdt scale of $Z_1$. The liquid alkyd resin was mixed with a solvent comprising 60 percent by weight of high flash naphtha (boiling point 141° C.–187° C.) and 40 percent aromatic petroleum (boiling point 140° C.–185° C.). The total solids of the resultant solution was 50 percent. This solution of alkyd resin was made up with high flash naphtha and driers to provide a clear solution comprising:

| | Percent by weight |
|---|---|
| Alkyd resin solids | 35.0 |
| Cobalt naphthenate in a solution (6 percent metal) | 1.1 |
| Lead naphthenate (24 percent metal) | 1.9 |
| Manganese naphthenate (4 percent metal) | 0.2 |
| High flash naphtha (boiling point 145° C.–187° C.) | 61.8 |

Three solutions of this mixture of resin solvent and drier were prepared, the compositions being respectively as follows:

| | A | B | C |
|---|---|---|---|
| Resin contained in 50 percent solids resin solution mixed with drier blend described, grams | 47.2 | 47.2 | 47.2 |
| Cumene hydroperoxide contained in 15 percent solution in aromatic naphtha, grams | | 1.5 | 1.5 |
| 2,6-Ditertiary butyl-4-methyl phenol, grams | | | 0.005 |
| Aromatic naphtha (boiling range 135° C.–185° C.), cubic centimeters | 15 | 3.5 | [1] 3.5 |

[1] The 2,6-ditertiary butyl-4-methyl phenol was dissolved in the aromatic naphtha.

Films of the mixtures were spread upon glass test panels and were dried at atmospheric temperature to provide solid coatings about 2 to 3 mils thick. The characteristics of the several films were as follows:

The films (A) containing no cumene hydroperoxide and no 2,6-ditertiary butyl-4-methyl phenol dried relatively slowly over a period of about 4 hours without wrinkling. The films were not fully cured in this time.

The films (B) containing the drier and the cumene hydroperoxide were dried through in a period of about 1½ hours. The films when tested with a pencil were obviously lacking in toughness. The films were substantially wrinkled with the striations running across the films.

The films (C) containing the drier, the cumene hydroperoxide and the 2,6-ditertiary butyl-4-methyl phenol dried through (at a rate only slightly slower than that of the film containing the cumene hydroperoxide but no inhibitor) over a period of 1 hour and 45 minutes to 2 hours. The films, as determined by a pencil hardness test, however, were substantially tougher than the films containing the cumene hydroperoxide without inhibitor and there was substantially less wrinkling.

Coating compositions, as herein disclosed, containing a drier, a peroxidic catalyst and a sterically hindered phenol may be used in the formation of original coatings. They are also very useful in repairing coatings which may have blemishes. Films thereof may be cured at room temperature or at elevated temperatures. They are considered to be especially useful for curing under normal atmospheric temperatures.

Although specific examples of the invention have been set forth hereinabove, it is not intended to limit the invention thereto, but to include all of the variations and modifications falling within the scope of the appended claims.

We claim:
1. A method of producing an air drying coating material which comprises admixing with a coating composition in which the vehicle is an ester of a polyhydric alcohol having at least three hydroxyl groups and a drying oil acid:
   (A) an organic peroxide which is an oxidation catalyst for the drying of said vehicle, and
   (B) a phenol in which both ortho positions are substituted with groups selected from the class consisting of saturated hydrocarbon radicals containing from 1 to 6 carbon atoms, chlorine, bromine, and iodine.

2. A method of producing an air drying coating material which comprises admixing with a coating composition in which the vehicle is an alkyd resin containing from about 30 percent to about 65 percent by weight based upon the resin of combined drying oil acids, said coating composition containing from about 0.1 percent to about 4 percent by weight based upon the resin of a drier metal in the form of a soap of a higher carboxylic acid:
   (A) from about 0.1 percent to about 8 percent by weight based upon the resin of cumene hydroperoxide, and
   (B) from about 0.005 percent to about 1 percent by weight based upon the resin of 2,6-ditertiary-butyl-4-methyl phenol.

3. A method of air curing a liquid alkyd resin containing drying oil acid groups and which further contains a soap of a direct metal, which comprises adding to the mixture an oxidation catalyst which is an organic peroxide, and a monohydric phenol, the ortho positions of which are filled by saturated hydrocarbon radicals containing from 1 to 6 carbon atoms, applying the mixture as a film upon a substrate and allowing the mixture to air dry.

4. A method of air curing a liquid alkyd resin containing drying oil acid groups and which further contains a soap of a drier metal, which comprises adding to the mixture an oxidation catalyst which is an organic peroxide, and 2,6-ditertiary butyl-4-methyl phenol, applying the mixture as a film and allowing the same to air dry.

5. The method according to claim 4 wherein the catalyst is cumene hydroperoxide.

6. A liquid coating material consisting essentially of
   (A) an air drying coating composition in which the vehicle is an ester of a polyhydric alcohol having at least three hydroxyl groups and a drying oil acid,
   (B) an organic peroxide which is an oxidation catalyst for the drying of said vehicle, and
   (C) a monohydric phenol in which the ortho positions are substituted with groups selected from the class consisting of saturated hydrocarbon radicals containing from 1 to 6 carbon atoms, chlorine, bromine, and iodine.

7. A liquid coating material consisting essentially of
   (A) an air drying coating composition in which the vehicle is an ester of a polyhydric alcohol having at least three hydroxyl groups and a drying oil acid,
   (B) an organic peroxide which is an oxidation catalyst for the drying of said vehicle, and
   (C) a monohydric phenol in which the ortho and para positions are substituted with groups selected from the class consisting of saturated hydrocarbon radicals containing from 1 to 6 carbon atoms, chlorine, bromine, and iodine.

8. The coating material of claim 7 in which said phenol is 2,6-ditertiary-butyl-4-methyl phenol.

9. A liquid coating material consisting essentially of
   (A) an air drying coating composition in which the vehicle is an alkyd resin containing an ester of a polyhydric alcohol and an unsaturated natural drying oil fatty acid,
   (B) an organic hydroperoxide which is the oxidation catalyst for the air drying of said resin, and
   (C) a monohydric phenol in which the ortho and para positions are substituted with groups selected from the class consisting of saturated hydrocarbon radicals containing from 1 to 6 carbon atoms, chlorine, bromine, and iodine.

10. A liquid coating composition comprising an air curing alkyd resin which is modified by acids of a glyceride drying oil to contain from about 30 to about 65 percent by weight based upon the resin of combined drying oil acids, said resin further containing about 0.1 to about 4 percent by weight based upon the resin of a drier metal in the form of a soap of a higher carboxylic acid, about 0.1 to about 8 percent by weight based upon the resin of cumene hydroperoxide, and about 0.005 to about 1 percent by weight upon a like basis of 2,6-ditertiary butyl-4-methyl phenol.

11. The composition defined in claim 10 wherein the resin is a glycerol phthalate modified with drying oil acids to the extent indicated.

References Cited by the Examiner
UNITED STATES PATENTS

| 2,957,833 | 10/60 | Baum | 260—45.95 |
| 2,984,648 | 5/61 | Williams et al. | 260—45.95 |

FOREIGN PATENTS

| 797,270 | 6/58 | Great Britain. |
| 615,805 | 8/55 | Canada. |
| 541,423 | 5/57 | Canada. |

LEON J. BERCOVITZ, Primary Examiner.

MILTON STERMAN, LEON J. BERCOVITZ, DONALD E. CZAJA, Examiners.

UNITED STATES PATENT OFFICE
CERTIFICATE OF CORRECTION

Patent No. 3,179,530                          April 20, 1965

J Alden Erikson et al.

It is hereby certified that error appears in the above numbered patent requiring correction and that the said Letters Patent should read as corrected below.

Column 7, line 62, for "direct" read -- drier --.

Signed and sealed this 12th day of October 1965.

(SEAL)
Attest:

ERNEST W. SWIDER                        EDWARD J. BRENNER
Attesting Officer                          Commissioner of Patents